United States Patent
Bednar et al.

(10) Patent No.: US 6,842,669 B2
(45) Date of Patent: Jan. 11, 2005

(54) COMPONENT INTERFACE MODULE

(75) Inventors: Fred H. Bednar, Pittsburgh, PA (US); Bruce M. Cook, Pittsburgh, PA (US); Louis W. Gaussa, Jr., Irwin, PA (US); Glenn E. Lang, Cabot, PA (US); William F. Schaefer, North Huntingdon, PA (US); Stephen Slinski, McKeesport, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 244 days.

(21) Appl. No.: 10/219,994

(22) Filed: Aug. 15, 2002

(65) Prior Publication Data

US 2004/0010324 A1 Jan. 15, 2004

Related U.S. Application Data

(60) Provisional application No. 60/324,322, filed on Sep. 24, 2001, and provisional application No. 60/324,331, filed on Sep. 24, 2001.

(51) Int. Cl.$^7$ ................................................. G05D 3/12
(52) U.S. Cl. ........................ 700/292; 710/110; 710/113
(58) Field of Search .......................... 700/292; 710/100, 710/113

(56) References Cited

U.S. PATENT DOCUMENTS

| | | | |
|---|---|---|---|
| 4,804,515 A | | 2/1989 | Crew et al. |
| 6,260,155 B1 | * | 7/2001 | Dellacona ...................... 714/4 |
| 6,292,523 B1 | | 9/2001 | Senechal et al. |
| 6,308,230 B1 | * | 10/2001 | Potter et al. ................... 710/64 |
| 6,556,345 B1 | * | 4/2003 | Gassner et al. .......... 359/341.4 |
| 6,631,146 B2 | * | 10/2003 | Pontis et al. ................... 372/20 |

* cited by examiner

*Primary Examiner*—Albert W. Paladini

(57) ABSTRACT

A component interface module (CIM) arbitrates through priority logic component command signals from redundant systems and integrates the selected priority command signal with component feedback signals in component logic to generate a control signal for a component in a complex plant. The non-software based CIM is programmable for use with a variety of plant components. The component logic includes blocking logic that prevents or terminates generation of the control signal such as when component activation has been completed. Diagnostics incorporated into the CIM include: an input port interface test, a pulse test that continuously checks for proper propagation of test pulses through the priority and component logic, and a test of the functioning of the CIM output device such as a relay.

24 Claims, 11 Drawing Sheets

COMPONENT INTERFACE MODULE

CROSS REFERENCE TO RELATED APPLICATION

This application claims priority of Provisional Patent Application Ser. Nos. 60/324,322 and 60/324,331, both filed on Sep. 24, 2001.

BACKGROUND OF THE INVENTION

1. Field of the Invention

This invention relates to a component interface module that arbitrates component command signals received from redundant systems, and integrates them with component feedback signals to generate component control signals. The component interface module incorporates diagnostic functions that take into account component state as reported by the component feedback signals.

2. Background Information

Certain complex plants integrate control signals from redundant systems to generate actuation signals for plant components. An example is a nuclear power plant, which utilizes a control system and a safety and protection system that independently utilize diverse sensors and logic to generate control signals for pumps, motors, contactors, solenoids, switchgear, and the like. In addition, manual control signals are integrated with the automatic signals. It is necessary to arbitrate the command signals from these multiple sources to generate the control signal for the component. Typically, the manual signals are given the highest priority. Signals generated by the automatic systems can be assigned priority in two ways: either one system has absolute priority over the other, or a command in one direction (e.g., open or closed, off or on) from either system has priority over a command in the opposite direction. A recently developed system implements priority between the automatic signals and the manual signals in a component interface module having output relays generating control signals sent to the component.

For reliability, the priority logic is non-software based and is commonly implemented in hardware such as gate arrays with the options on priority selected by jumpers.

The various components can have their own requirements for the actuation signals. For instance, contactors require a continuous control signal while motor operated valves only require a control signal during movement of the valve member. In the latter case, the control signal needs to be terminated to prevent burnout of the relay generating the control signals. Typically, such components have position limit switches and often also have torque limit switches. A position limit switch can be used to indicate that the valve has opened. Another can be used to indicate a closed valve, although in some circumstances where full closure of the valve is essential, the torque limit switch provides the closed indication.

At present, the component logic, that is the logic associated with, for instance, the component position and torque limit switches, is implemented at the component, and at the actuating power level of the component, even in the above-described system that combines the automatic signals and the manual signals in a component interface module.

There is room, therefore, for improvement in the interfaces between plural systems generating component command signals and the components they control.

SUMMARY OF INVENTION

The present invention is directed to a non-software based component interface module between software based systems generating duplicate sets of component command signals and a controlled component. The component interface module comprises: a plurality of input ports through which the duplicate sets of component command signals are input, a non-software based processor arbitrating the first and second sets of component command signals and integrating therewith component feedback signals to generate a component control signal, and an output device outputting the component control signal to the controlled component. The processor includes priority logic arbitrating between the sets of component command signals to select a priority component command signal, and component logic integrating selected component feedback signals with the priority component command signals selected by the priority logic. The priority logic either applies system priority through which one of the sets of component command signals from one of the systems has absolute priority over component command signals from the other system, or function priority where a component command signal generated by either system commanding a first function of the controlled component has priority over another component command signal commanding a second related function of the control component. For instance, an open or start signal can be given priority over a closed or stopped signal, or vice versa. As another aspect of the invention, the component logic can include hold logic that maintains a control signal selected from one of opposed component command signals until the other of the opposed component command signals is selected by the priority logic.

The component logic can be programmed by giving effect to selected ones of the component feedback signals, such as by the use of jumpers thereby maintaining the reliability of the hardware-based processor.

As another aspect of the invention, the processor of the component interface module can include logic that performs diagnostics on the component interface module. Various types of diagnostics can be performed. For instance, the diagnostic logic can include a port interface tester that includes a latch latching the command signal input to the input port at the time the port interface test is initiated. The input signal is then toggled and an input port fault signal is generated if the input signal sensed by the port does not differ from the latched signal.

The diagnostic logic can also include a pulse tester that sends pulses, preferably continuously such as at spaced intervals, through the priority logic and the component logic, and test analysis logic that determines test results from propagation of the test pulses. A pulse test failure signal is generated when no test pulses appear on the output device. However, the component logic preferably includes blocking logic blocking generation of the control signal applied to the output device in response to certain component feedback signals. Under these circumstances, the test analysis logic generates a test failure signal only when no test pulses appear at the output device and the blocking logic is not blocking generation of the component control signal.

In accordance with another aspect of the invention, the component command signals include a pair of opposed, for example on/off signals, each actuating a separate output device, the pulse tester alternately sends pulses through the priority component logic on the opposed component command signals. The test analysis logic generates a pulse test failure when either of the output devices does not see the pulse applied to the corresponding one of the component command signals and the control signal has not been blocked by the blocking logic. Where the component logic includes hold logic that maintains a component control signal until the opposed component command signal is applied, the test analysis logic generates a pulse test fail signal if the output device associated with the control signal that is maintained does not see the pulses on the opposed component control signal.

The diagnostic logic can also include relay function monitoring logic. This logic can detect a failure of the relay coil when the component control signal and the component feedback signal representing coil status do not match. Coil contact failure is indicated when the component control signal and the voltage across the relay contacts are either both zero or both non-zero.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
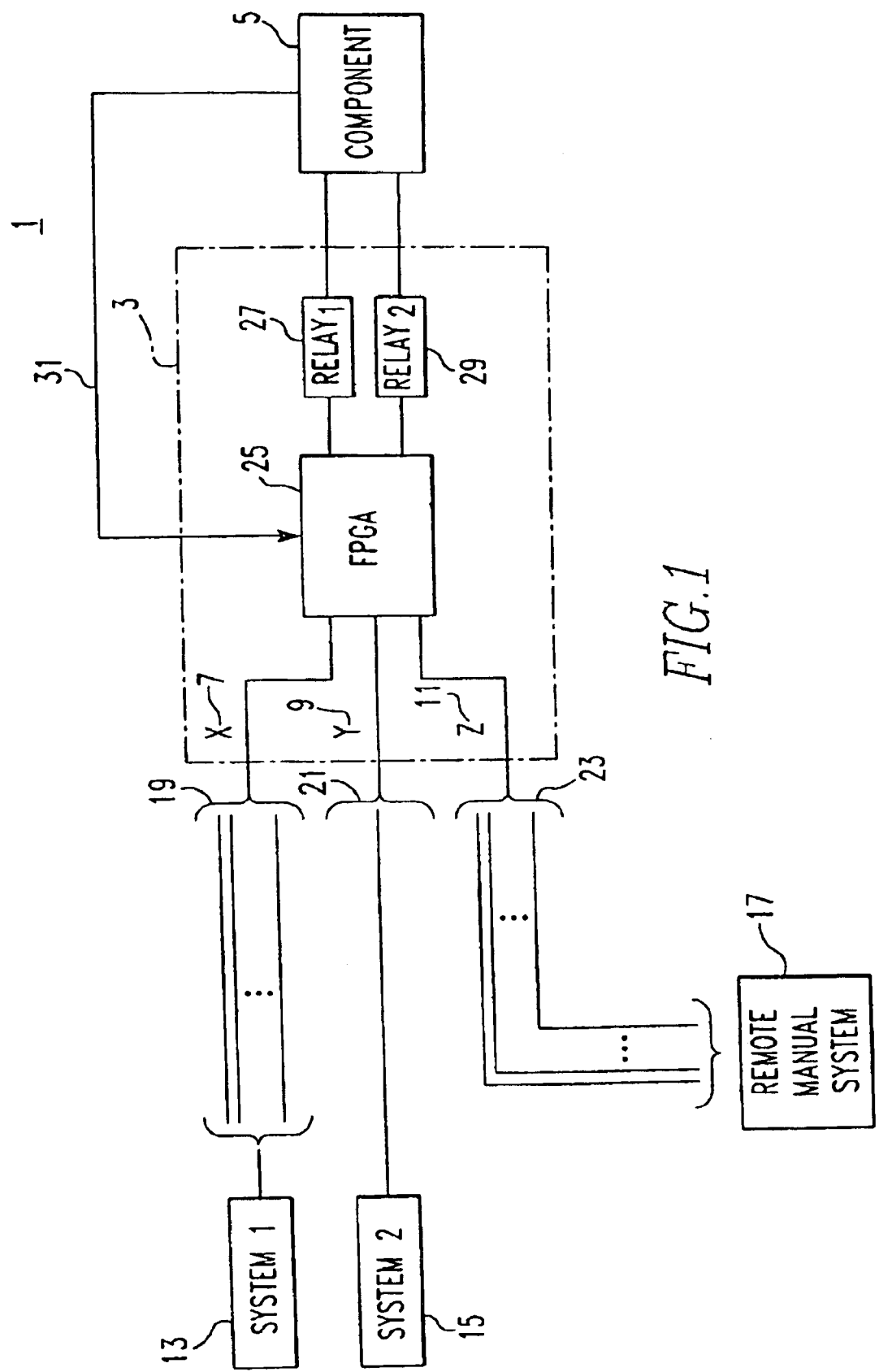
FIG. 1 is a simplified block diagram of a plant incorporating a component interface module in accordance with the invention.

The component interface module (CIM) of the invention provides a standardized, object-oriented interface to controlled components in a complex plant. The invention will be described as applied to a nuclear power plant, but it has wide application to various types of complex plants in which components may be controlled with component command signals derived from multiple sources. FIG. 1 illustrates in very simplified form, application of the CIM of the invention to the instrumentation and control systems 1 of a nuclear power plant. The component interface module 3 is a non-software-based qualified nuclear safety grade module. However, the module 3 can be used in both nuclear safety and non-safety systems. The CIM 3 provides the complete interface from the control system to a controlled component 5. Similar CIMs 3 are provided for each controlled component in the plant.

The CIM has three input ports, Port X, Port Y, and Port Z identified by the reference characters 7, 9 and 11, respectively, in FIG. 1. These three ports are normally connected to three different systems. For a typical nuclear protection system application the three ports 7, 9, and 11 would be connected to a first or primary system 13, e.g., the Primary Reactor Protection System, a second or diverse system 15, e.g., the Diverse Protection System, and a remote manual system 17, e.g., a hard wired remote manual control system. Component command signals or actuation commands are received on the Port X 7 from the primary system 13 through a hard wire connection 19. Duplicate component command signals from the diverse system 15 are received at the Port Y 9 over a serial input/output bus 21. The remote manual control 17 may be in the plant main control room, the emergency control room, or some local control panel in the plant and is connected to Port Z 11 by the hard wire connection 23. The Port Z input is not intended to be the "normal" manual control. Such normal control would ordinarily be done through the computer-based systems 13 and 15 where the appropriate relationship to automatic control, operational modes, interlocks and the like can be established. The remote manual system 17 is provided principally for the purpose of diversity and defense in depth. However, in any given application, the Port Z 11 can be used for some other function, manual or automatic, that is suited to its design. For instance, it could be used as a local control panel that is adjacent to the controlled component, such as a pump. Any of the control ports 7, 9, or 11 that are unused for a given application of the CIM 3 are left unconnected. Each of the Ports X, Y, and Z can be hard wire connected to an external system or connected through a computer bus, such as a serial or parallel input/output bus.

The heart of the CIM 3 is a non-software processor 25. In the exemplary module, a field programmable gate array (FPGA) is used as the processor 25. As will be discussed, the processor 25 performs logic functions on inputs received through the ports 7, 9 and 11 to generate control signals which are applied to output devices in the form of relays 27 and 29. The relay 27 controls actuation of the component 5 while the relay 29 controls deactuation. The exact function of these relays 27 and 29 depends upon the operating characteristics of the component 5. For instance, the relay 27 could be assigned to open or close a valve with the relay 29 providing the opposite actuation. Similarly, these two relays could be used to open and close switchgear. For some components only one relay is needed. For instance, in the case of a solenoid, the relay 27 would be continuously energized to actuate the solenoid and de-energized for deactivation. The component 5 provides component feedback signals to the FPGA 25 of the CIM 3. These feedback signals are passed on by the FPGA 25 to the primary and diverse systems 13 and 15, and to the remote manual system 17 through Ports X, Y and Z, respectively.

The CIM 3 provides several functions related to the interface between the systems 13, 15 and 17 and the component 5, including: voltage and current level transition between the computer logic of the systems and the component control circuits, prioritization of component command signals from the various systems and control points, fast interlock between component feedback signals and the component command signals, and local actuation and indication of equipment status for plant testing and maintenance. The specific functions required vary from one component to the next based on the type of equipment being controlled and on unique functional requirements for that particular component. The CIM 3, on the other hand, is designed as a universal control interface. As will be seen, configuration jumpers are used to select various features of the CIM logic to match the particular functional requirements. Additional control logic is performed by the host systems 13 and 15 in software to meet project specific requirements. This additional logic includes things such as the combination of automatic and manual commands, combination of multiple points of manual control (including soft and hard controls), interlocking of plant components (for instance, opening a valve when a pump starts) and determining actuation discrepancies when failures prevent proper component operation.

Figure 2A:
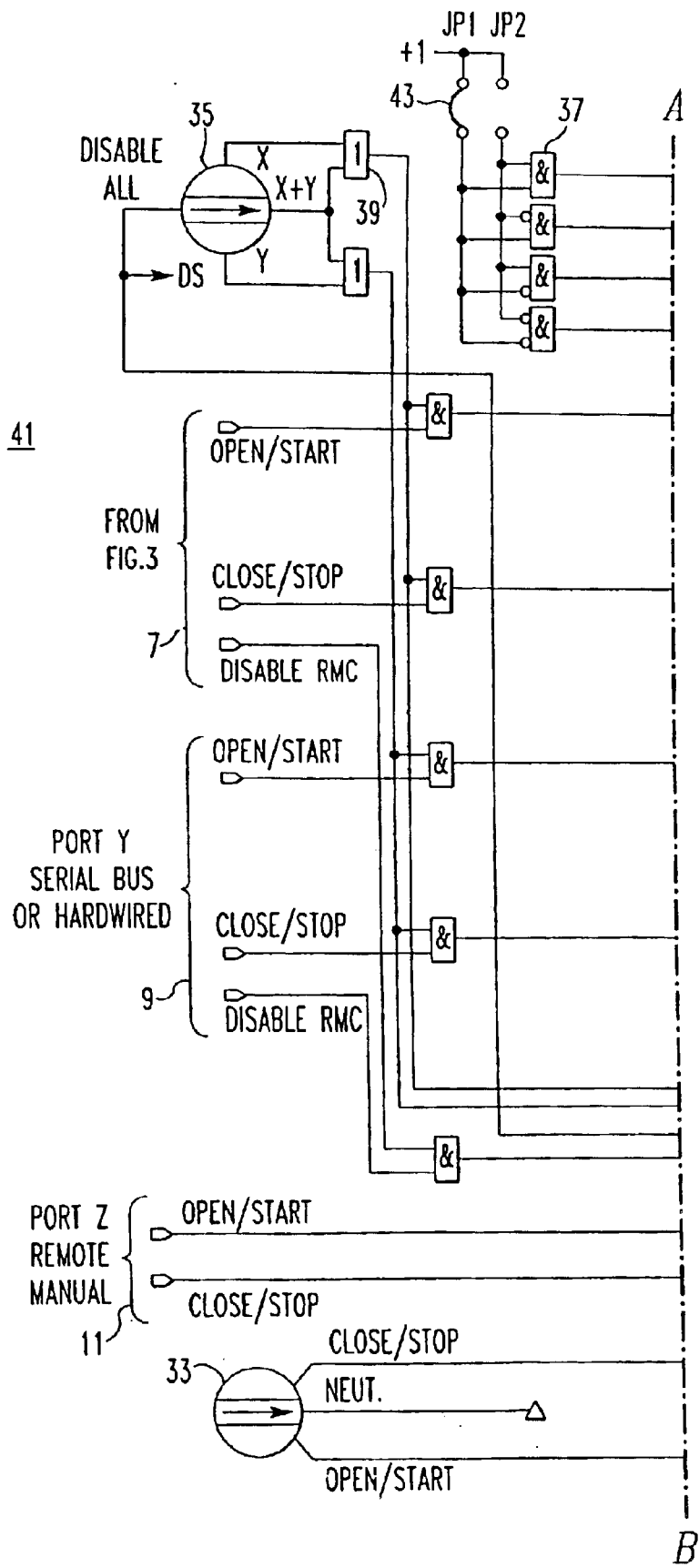
FIGS. 2A and 2B when aligned present a block diagram of priority logic which forms part of the component interface module illustrated in FIG. 1.
Figure 2B:
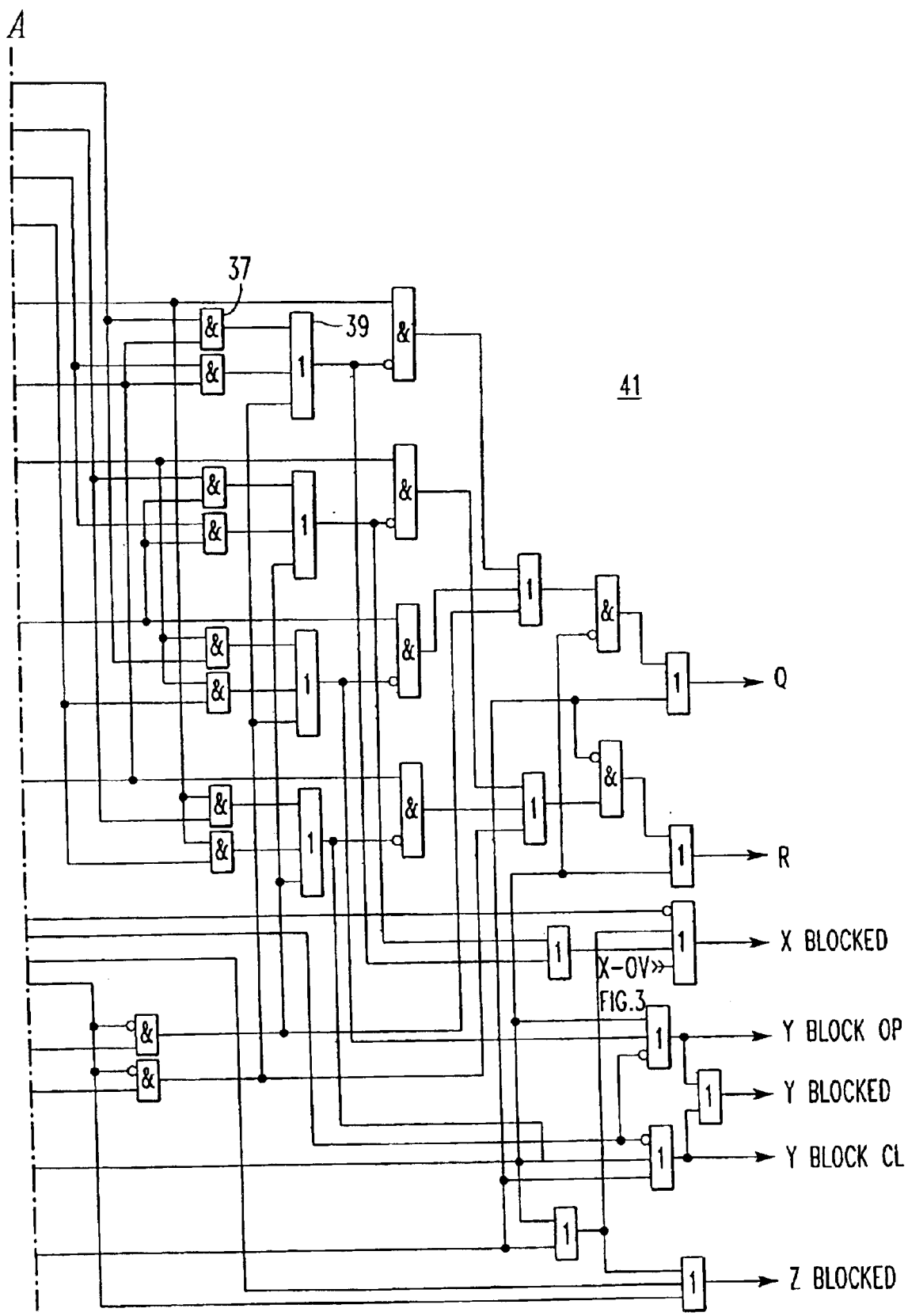

The CIM logic consists of two parts. In the exemplary embodiment of the invention these two parts are combined in a single FPGA 25. The first part of the logic is the priority logic 41 which is illustrated in FIGS. 2A and 2B. Component command signals, for instance, open and close a valve, or start and stop a pump, are received from four sources; the two "host" systems 13 and 15 through the Ports X and Y, respectively, and two dedicated manual controls, including the remote manual system 17 through the Port Z. The second manual control is a local manual control provided by the switch 33.

A second control switch 35 located on the module allows the selection of the "host" system control modes. In the normal position, this control 35 enables both "host" systems according to the priority logic to be discussed. The control 35 may also be rotated to enable only the Port X system or the Port Y system. A fourth position of the control 35 disables the relay outputs of the CIM 3 and would be used for maintenance purposes.

In accordance with standard symbolization, the elements 37 containing an "&" are AND gates while the elements 39 containing "1" are OR gates. The logic is rendered programmable through a number of jumpers 43.

The priority logic 41 provided by the CIM 3 can be generally stated as follows:

The local manual control 33 has the highest priority

The remote manual control 17 has priority over the "host" systems 13 and 15

Priority of commands between the "host" systems may be selected to be one of two cases
  One system will have absolute priority over the other, or
  A command in one direction (i.e., open or close) from either system has priority over the opposite command direction.

This priority logic 41 works on the general principle of a command in one direction (e.g., open or close) blocking the opposite command from ports of a lower priority. It is not necessary to block the commands in the same direction, thus allowing a reduction in the number of logic gates. The priority mode between the Port X and Port Y actuations is selected by two configuration jumpers 43, labeled JP1 and JP2, according to Table 1.

TABLE 1

Priority Mode Jumper Configurations

| Priority Mode | JP1 | JP2 |
|---|---|---|
| System X has priority over system Y | — | — |
| System Y has priority over system X | — | ✓ |
| Open (start) command has priority over close | ✓ | — |
| Close (stop) command has priority over open | ✓ | ✓ |

In addition to the prioritization of actuations, command signals are provided in the Port X and Port Y connections to allow the "host" systems 13 and 15 to disable the remote manual control 17. To do this, both systems must assert a logic "1" on this command signal. This provision is to be used for cases where the controls from a given workstation, such as the main control room, must be disabled when that workstation is not occupied. An example of the use of this disable feature is the transfer of control from the main control room to the emergency control room. Requiring a coincidence of both systems prevents a single failure from blocking the remote manual control.

Signals are developed (lower right corner of FIG. 2B) for returning to each of Ports X, Y and Z to indicate that commands through the port are blocked, either by the selector switch 35 on the CIM or by a higher priority command. Note that even in the event that priority between X and Y is based on the state of the component, the indication that the actuations of a given system are blocked is correct in that the opposite command will not pass through the logic. An actuation by one of the systems will not provide indication to itself that the opposite command is blocked.

Figure 3:
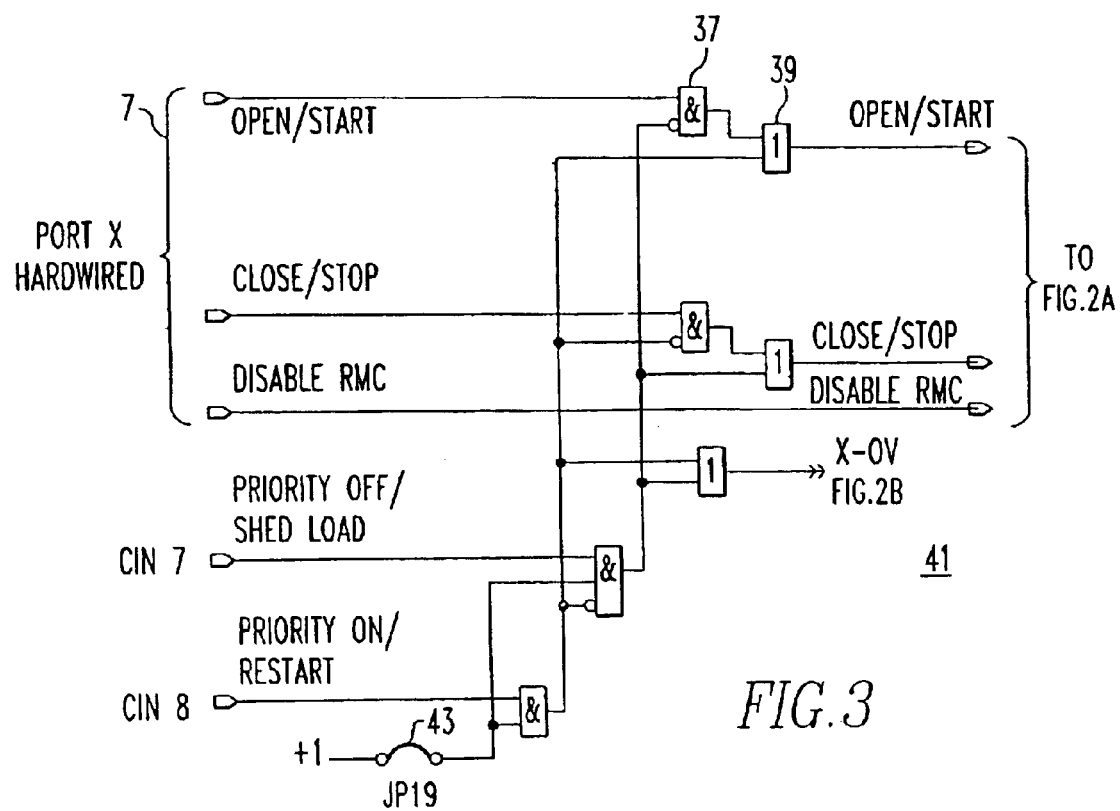
FIG. 3 is a block diagram of additional priority logic which can be used for load sequencing under control from an external system.

An additional set of OFF/ON input commands are provided for use where a signal must be dealt with as a hardwired signal from the field. These commands, as shown in FIG. 3, are connected to CIN7 (Priority OFF) and CIN8 (Priority ON) inputs. The primary application of these signals will be for load sequencing under control of an external system. Two configurations are possible. The first uses only the CIN7 input. At the beginning of the sequence, this signal is asserted to shed the load. As long as the signal is maintained, normal start commands through the other inputs are blocked. When the signal is removed, normal start of the pump is permitted. The second possible configuration uses both inputs. The CIN7 Priority OFF command is again used to shed the load at the beginning of the sequence. However, the CIN8 Priority ON command is used to restart the load at the specified time. The Priority ON command has precedence over the Priority OFF to allow this functionality. The restart command would be effective regardless of the state of the load prior to the sequence.

The Priority OFF and ON commands are combined with the normal commands from Port X as shown in FIG. 3. This gives these sequencing commands a higher priority than Port X itself. This priority is not configurable, however, jumper JP19 is used to enable the Priority OFF/ON inputs. If this jumper is removed, inputs CIN7 & 8 are read into the Port Y serial buffer, but have no effect on the component function.

Figure 4A:
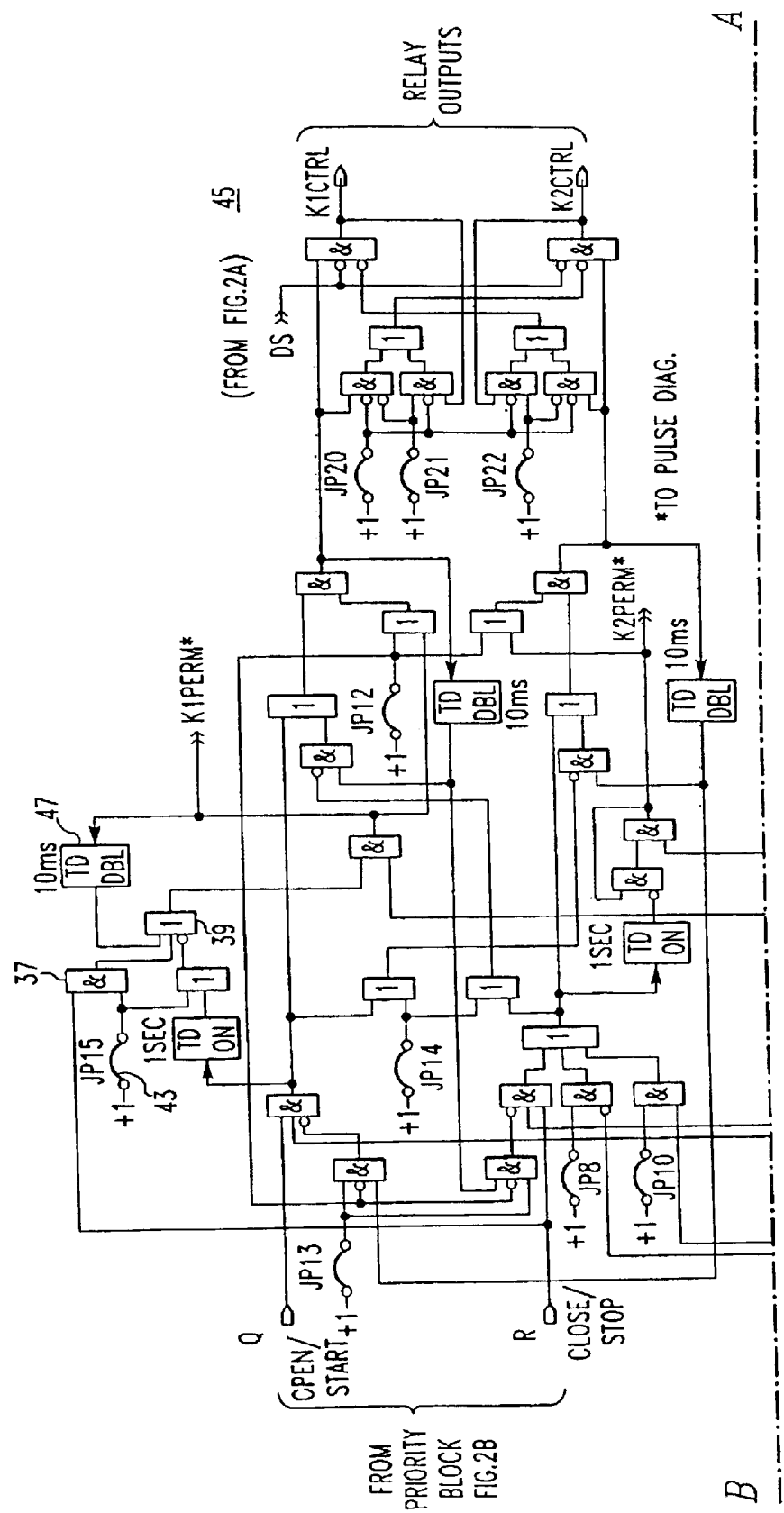
FIGS. 4A and 4B when aligned illustrate a block diagram of the component logic for the component interface module.
Figure 4B:
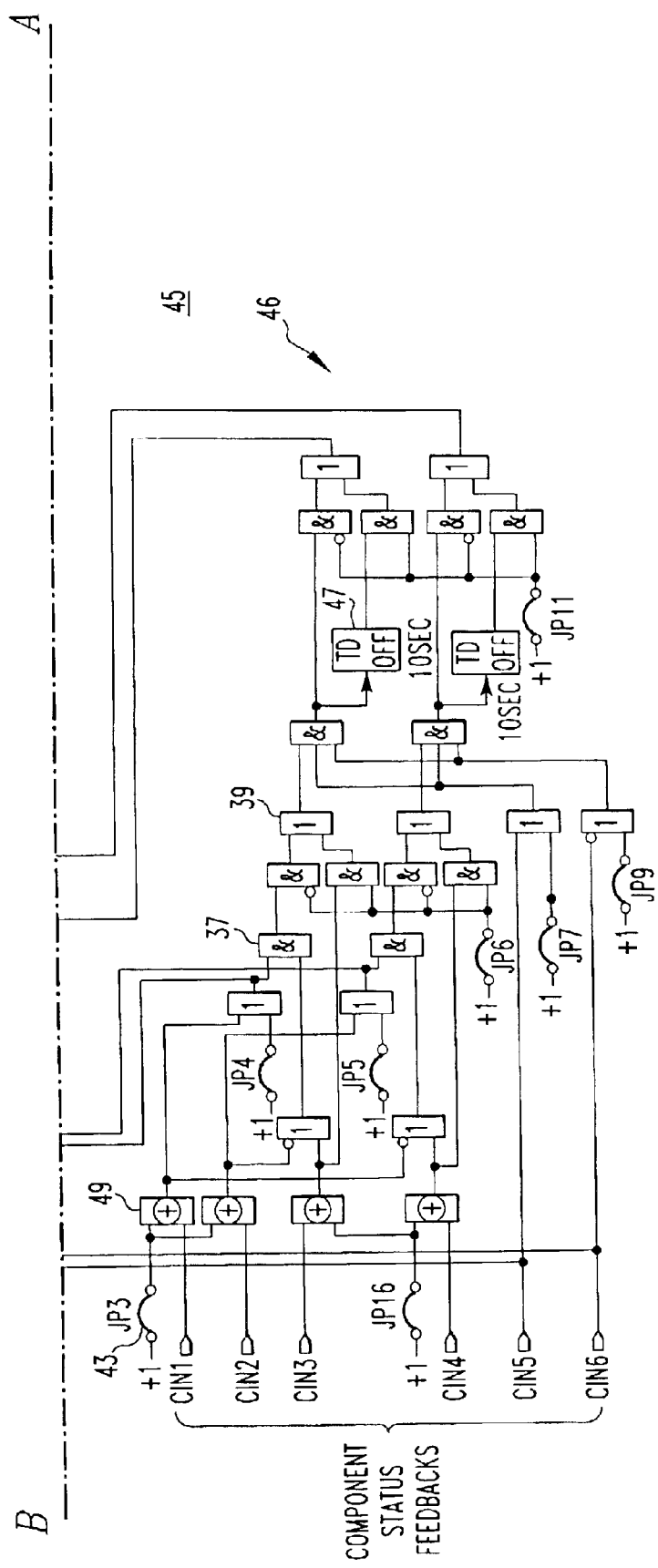

The configurable CIM component logic 45 is shown in FIGS. 4A and 4B. It is roughly divided into two parts. In FIG. 4A, the component command signals are received from the priority logic block 41 and, after latching and blocking, are applied to the output drivers for the relays 27, 29. The portion of the logic diagram shown in FIG. 4B takes the contact input component feedback signals from the controlled component 5 and performs blocking logic 46 to determine when the actuations should be unlatched and blocked.

The component logic 45 includes in addition to the AND gates 37 and OR gates 39 several time delay elements 47. These time delay elements provide three types of delays: a delay in passing the applied signal labeled "TD ON", a delay in turning off the applied signal labeled "TD OFF", and a delay in turning on and turning off the signal labeled "TDDBL". The times of the various delays are provided adjacent to the element 47. The "TDDBL" time delays 47 have been added in latch feedback loops in the logic. These are "double acting" delays in that both the rising edge and the trailing edge of the input are delayed by the indicated 10 milliseconds. If the input duration is less than 10 milliseconds, there is no output. Similarly, if a logic high input is momentarily pulsed low (less than 10 millisecond duration) there will be no change in the output. These delays allow for short pulses to be propagated through the logic without affecting the state of the latches. Such pulses may be used for diagnostic purposes to determine that the CIM is ready to actuate a given output. The blocking logic 46 also incorporates exclusive OR gates 49 represented by a "+" sign within a circle inside a rectangle.

The meaning of the eight contact input signals depends on the specific application and type of component being controlled. However, the general description of these signals is as follows:

CIN1 Position of the component in the actuated state (valve open, pump running or switchgear closed)

CIN2 Position of the component in the unactuated state (valve closed, pump stopped or switchgear open)

CIN3 Low TRUE; Torque limit exceeded in the opening direction (may be combined with limit switch at the valve); closed contact permits motion CIN4 Low TRUE; Torque limit exceeded in the closing direction (may be combined with limit switch at the valve); closed contact permits motion CIN5 Low TRUE interlock; closed contact permits motion; open contact may be configured to cause breaker trip CIN6 High TRUE interlock; open contact permits motion; closed contact may be configured to cause breaker trip CIN7 Priority OFF [Sequence Load Shed] (see FIG. 3)

CIN8 Priority ON [Sequence Restart] (see FIG. 3)

In all cases, the statuses of the contact input component feedback signals are sent to the "host" systems 13, 15 for combination in other upstream logic and for signaling to the operator. For inputs CIN5 through CIN8, the configuration jumpers will, in some cases, remove the inputs from their contribution to the logic. In this case, these feedback signals become general purpose inputs to the software of the "host" systems.

The specific functions of the CIM 3 for a given application are selected using configuration jumpers 43. Table 2 provides the definitions of these jumpers. A jumper being "ON" means that it is in place, providing a logic "1" to the FPGA 25 If the jumper is removed, a logic "0" is provided to the FPGA, and the jumper is said to the FPGA which uses these signals to select the dynamic logic signals. For non-safety system applications of the CIM 3, the configuration settings may be established under control of the software of the "host" system (Port Y).

TABLE 2

Configuration Jumper Definitions

| Jumper | Meaning when present (ON) | Meaning when absent (OFF) |
| --- | --- | --- |
| JP3 | CIN1 and CIN2 position inputs are inverted from CIM convention; CIN1 = VALVE FULLY OPEN; CIN2-VALVE FULLY CLOSED | CIN1 and CIN2 position inputs follow CIM convention; CIN1 = VALVE NOT FULLY OPEN; CIN2 = VALVE NOT FULLY CLOSED |
| JP4 | Open/start command removed on torque input (CIN3) | Open/start command removed on position input (CIN1) |
| JP5 | Close/stop command removed on torque input (CIN4) | Close/stop command removed on position input (CIN2) |
| JP6 | Torque & position switch logic combination is external to CIM | Torque & position switch logic combination is performed by CIM |
| JP7 | Commands not blocked by CIN5 interlock input | Block commands on low true interlock input (CIN5) |

TABLE 2-continued

Configuration Jumper Definitions

| Jumper | Meaning when present (ON) | Meaning when absent (OFF) |
| --- | --- | --- |
| JP8 | Low true interlock input (CIN5) causes trip command output | No command from CIN5 interlock input |
| JP9 | Commands not blocked by CIN6 interlock input | Block commands on high true interlock input (CIN6) |
| JP10 | High true interlock input (CIN6) causes trip command output | No command from CIN6 interlock input |
| JP 11 | Removal of commands on component position delayed 10 seconds | Remove of commands on component position/torque is immediate |
| JP12 | Commands remain after completion of component travel | Commands removed upon completion of component travel |
| JP13 | If JP14 is OFF, component cannot be reversed until travel is completed | Opposite command has immediate effect to reverse component |
| JP14 | Commands not latched on CIM | CIM latches commands |
| JP15 | Once breaker has closed, a trip command must be issued before another close (Anti Pump Latch) | Anti Pump Latch is disabled; interlocking of commands is per the settings of other jumpers |
| JP16 | Inverts the logic sense of inputs CIN3 and CIN4. This also allows these inputs to be left open if unused. | Logic sense of CIN3 and CIN4 is "LOW TRUE", as described |
| JP19 | Enables Priority OFF and Priority ON commands on CIN7 & CIN8 to be combined with Port X commands | CIN7 and CIN8 have no affect on logic. hey are only general inputs to the software of the host system |
| JP20 to JP22 | Anticoincidence logic configuration (see text) | |

The CIM 3 uses the convention for its own logic of a component (e.g., valve) being NOT FULLY OPEN or NOT FULLY CLOSED. By following this convention, mid-stroke is represented by both signals being true, while if both signals are false an error condition (possibly loss of power) exists. In some cases, the available signals from the valve may not follow this convention. The JP3 configuration jumper inverts the CIN1 and CIN2 inputs so that a VALVE OPEN becomes NOT FULLY OPEN and a VALVE CLOSED becomes NOT FULLY CLOSED.

It is often the case that the motor torque limit switches and the valve position limit switches will be wired together at the valve. This practice saves wiring between the valve and the MCC that controls it. The combined input signal has the meaning that the valve should stop because of high torque or because it is open (closed). It is usually the case that the torque switch is bypassed until the position limit switch indicates that the valve has moved off of its extreme position. The JP6 configuration jumper tells the CIM that the logic of combining torque and position is done external to the CIM (i.e., at the valve). In this case, the valve command is stopped when the corresponding "torque" input contact opens. The CIN1 and CIN2 inputs have no affect on the logic but are passed to the software systems. If the JP6 configuration jumper is not in place, the CIN3 and CIN4 inputs are treated as simple torque limit switches and are combined with the position inputs CIN1 and CIN2 in the CIM logic.

When the position/torque logic is done on the CIM 3, two additional configuration jumpers 43 control the action. Jumper JP4 configures the open command while JP5 configures the close command. When these jumpers are in place, the valve is stopped on torque only. With the jumper removed, the valve is stopped on either torque or position limit. It is often the case for MOVs (motor operated valves)

that the close direction is configured to stop on torque only. This ensures that the valve is tightly closed since position limit switches often change state before the absolute end of travel. When a valve has been torqued closed, it is necessary to bypass the torque limit switch on opening until the position limit switch indicates that the valve has moved off of its seat. The CIN1 and CIN2 inputs are also used to prevent the initiation of action when a component is already in the desired position. For example, an "open" command cannot be sent to a valve that is already open, regardless of the state of the torque inputs. Jumpers JP4 and JP5 can be inserted to override this restriction, thus always allowing the command through. Note that this command blocking does not affect a latched command that is already in the process of execution, i.e., the valve will continue to close until the torque switch opens if so configured.

There will be some applications of the CIM where the entire motor stop logic is done external to the CIM 3. In these cases, the torque switch signals will not be available to use as the basis for de-energizing the CIM outputs. It is still desirable to de-energize the CIM outputs to preserve the relays 27, 29. Configuration jumper JP11 is provided to give a delayed turn-off of the outputs following completion of travel as indicated by the position inputs. The delay is set at a fixed 10 seconds. It s noted that if the valve motion is stopped in mid-travel due to torque limit or thermal overload, the CIM outputs will remain energized continuously. Precautions must be stated in the maintenance procedures to clarify that valve motion may restart immediately when the condition clears. If JP11 is not inserted, the de-energization of CIM outputs at travel limit is immediate.

For electrical switchgear and large motors, it is necessary to prevent the breaker from "pumping" closed then open then closed, etc. To accomplish this, a latch is set when an Open Breaker command is issued and the breaker actually becomes open. This latch is used to grant permission to the Close Breaker command for one attempt. When the breaker closes, the latch is cleared until the next open command. The JP15 configuration jumper selects this latched signal as the basis for blocking the output. Thus, if a breaker has been closed, even momentarily, and then trips open for its own reason (e.g., over-current) subsequent close (ON) commands are blocked until an open (OFF) command is given. If JP15 is not inserted, CIM outputs are enabled every time the opposing state is true (e.g., close breaker is enabled whenever the breaker is open) depending on the setting of the other configuration jumpers.

Configuration jumpers JP7 and JP9, when removed, enable the interlocks CIN5 and CIN6, respectively, to block the commands. CIN5 is low true logic; an open contact prevents commands. CIN6 is high true logic; a closed contact prevents commands. Inserting the jumpers JP7 and JP9 overrides these interlocks.

For breakers, which do not use the torque inputs, an additional interlock on closing (ON) commands is provided by the CIN3 input. An open contact on this input prevents the START/ON command from being issued. If this feature is not used, either jumper JP16 must be inserted or the input must be "strapped" at the terminals to provide a constant logic "1". Jumper JP16 must be inserted (or input CIN4 must be "strapped" to be logic "1") and jumper JP5 must be inserted to allow the trip commands from either CIN5 or CIN6 to propagate.

In all of the above cases where it is desired to de-energize the command outputs on completion of travel or interlock conditions, jumper JP12 should be removed. When JP12 is inserted, the output commands are maintained regardless of the feedback inputs. This would typically only be used with solenoid valves or motor contactors.

For electrical breakers, it is possible to configure the CIN5 and CIN6 inputs to provide an active trip command to the breaker rather than merely blocking commands from the "host" systems. This could be used, for instance, to implement a high reliability, high-speed trip on over-current or some other detected condition of the breaker or its load. The JP8 and JP10 jumpers enable this trip command from the CIN5 and CIN6 inputs, respectively. Again, CIN5 is low true; an open contact causes the trip. CIN6 is high true; a closed contact causes the trip. When either of these jumpers is inserted, the corresponding interlock jumper, JP7 or JP9, must also be inserted.

Configuration jumper JP14 determines whether or not commands are latched in the CIM logic. When this jumper is inserted, commands are not latched. If commands are latched, completion of travel (depending on the setting of jumper JP12) will cause the latch to be reset. Generally, an opposite command to the one latched will cause a latch to be reset and the one for that opposite command to be set. The signals going into the latch have a 1 second "one-shot" time 47. This has the effect of making the latch a "set priority" for the first second and a "reset priority" after that. If the torque limit signal momentary bounces during the first second, the command will be re-latched and the output relay will be energized again. After the 1 second time-out, torque limit will permanently unlatch the command. This feature is present regardless of the latching of commands. Thus for throttling MOVs, momentary torque inputs during the first second following the onset of the command will only temporarily remove the output, while those that occur after one second will permanently remove the output until the command is removed and then reinstated. Note that this feature is also present on the trip command for breakers, but does not offer any usable functionality. On the close breaker command, this feature is replaced by the anti-pump latch described earlier.

When commands are latched, it is possible to block opposite commands until travel is completed by inserting jumper JP13. This would be done to prevent an MOV from reversing in mid-stroke. Jumper JP12 must be removed when JP13 is inserted, thus enabling unlatching at the completion of travel.

The relay outputs of the CIM module are usually mutually exclusive, i.e., it is intended that only one would be energized at any given time. The configuration of this anti-coincidence logic is provided through jumpers JP20, JP21 and JP22 according to Table 3. Normally, the host systems, in conjunction with the priority logic, prevent coincident output signals. However, there may be situations for some applications of the CIM where such coincidence is possible, or even desired. The default case, with none of the three jumpers inserted, is that coincident output signals will cause both outputs to be de-energized. Other possible actions are described in the table.

TABLE 3

Anti-coincidence Logic Configuration

| Jumpers | | | |
|---|---|---|---|
| JP20 | JP21 | JP22 | Action on Coincident Output Signals |
| — | — | — | Both output relays are de-energized (default case) |
| ✓ | X | X | Both output relays are energized (coincidence permitted) |

TABLE 3-continued

Anti-coincidence Logic Configuration

| Jumpers | | | |
|---|---|---|---|
| JP20 | JP21 | JP22 | Action on Coincident Output Signals |
| — | ✓ | — | K2 relay energized (Close/Stop precedence) |
| — | — | ✓ | K1 relay energized (Open/Start precedence) |
| — | ✓ | ✓ | First relay to be energized will remain energized, the other is blocked |

The check mark means the jumper is in place, the dash means the jumper is removed and an "X" means that it does not matter whether the jumper is in place or not.

The CIM 3 has several features that support diagnostics. These are primarily focused on the Port X connector since this is the one that will normally be used for safety system commands. Nevertheless, the diagnostics provide partial coverage of all systems since the commands from the various sources overlap at the priority logic 41.

Figure 5:
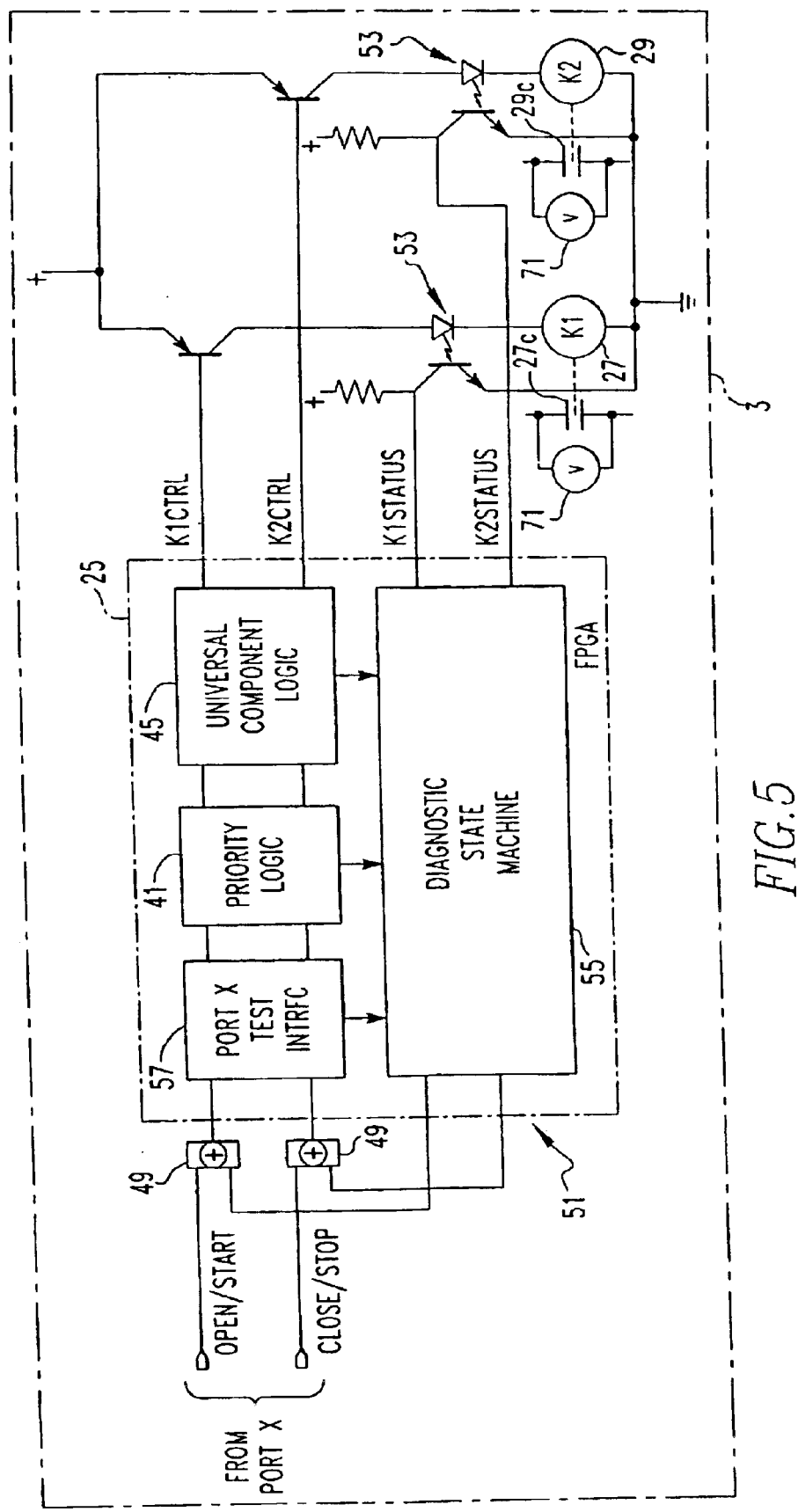
FIG. 5 is a block diagram of the diagnostics which form part of the component interface module.

FIG. 5 shows a block diagram of the CIM diagnostic function 51. Although this is implemented within the FPGA device 25, it requires support from circuits outside of the FPGA. The first of these support circuits is the addition of exclusive OR gates 49 at the Port X inputs for the Open/start and Close/stop commands. These gates 49 combine the component command signals with test pulses that are generated by the FPGA 25 so that a high test pulse or a zero test pulse is applied on the component command signal dependent upon whether the latter is low or high at the time of the pulse test. The second support circuit is a current monitor 53 in each of the output relay coils K1 and K2, 27 and 29. The diagnostics also include a diagnostic state machine 55 to be described.

Figure 6:
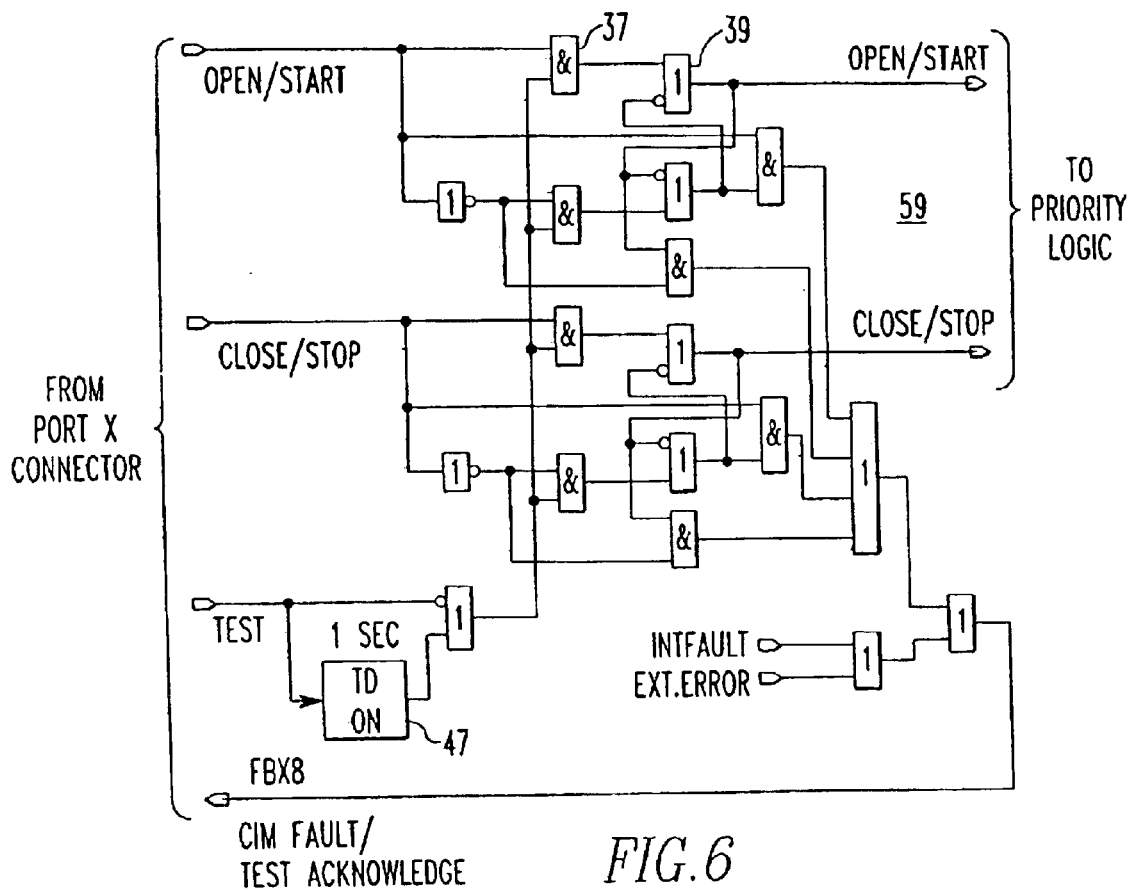
FIG. 6 is block diagram of the input port test interface.

The first diagnostic is the Port X test interface 57. To implement this test, the Port X connector includes a Test handshake signal that allows the "host" system 13 to check the interface for the Open/start and Close/stop commands. The test coverage includes the digital outputs of the computer system 13, the connection of cable 19 to the CIM 3, the input signal conditioning circuits (not shown) and the pin inputs to the FPGA 25 on the logic board. FIG. 6 shows the port interface test logic 59 implemented on the FPGA that supports this test interface.

The logic circuit 59 consists of a track hold for each of the two opposed command signals. While the Test input is low, the commands are passed through to the output of the circuit. When the Test signal goes high, both outputs are held at the current state. The output of the latch is compared to the input. An Acknowledge signal is generated if the two differ. This Acknowledge signal is Ored with the CIM Fault signal that is returned to the "host" system via the Port X connector. A one-second timer limits the duration of the hold state.

Using this circuit, the "host" system will test the interface by applying the following steps:

1. The CIM Fault signal is checked to be clear. If not, the test sequence is abandoned.
2. The Test line is set high.
3. The Open/start command is toggled (if low then set thigh, and vice versa)
4. The CIM Fault signal is checked to be set (if not an alarm is set).
5. The Open/start command is returned to the original state.
6. The Test signal is set to low.
7. The six steps are repeated for the Close/stop command.

The test can be abandoned at any time and a valid command sent through the input by setting the Test input low.

It is envisaged that the test sequence will take a number of processor cycles to complete. It will be executed approximately once per minute.

Although no similar test feature is provided for Port Y, it should be noted that the serial bus communications themselves provide a high degree of interface checking.

The second diagnostic is a continuous pulse test of the priority and component logic. Pulses are alternately applied to the Open/start and Close/stop commands of Port X. The change in state of the current flowing in the output relay coils 27 and 29 is latched. The momentary outputs are analyzed, using information from the configuration of the component logic, to determine if the response was correct. If not, a latch is set to indicate the fault state.

Figure 7:
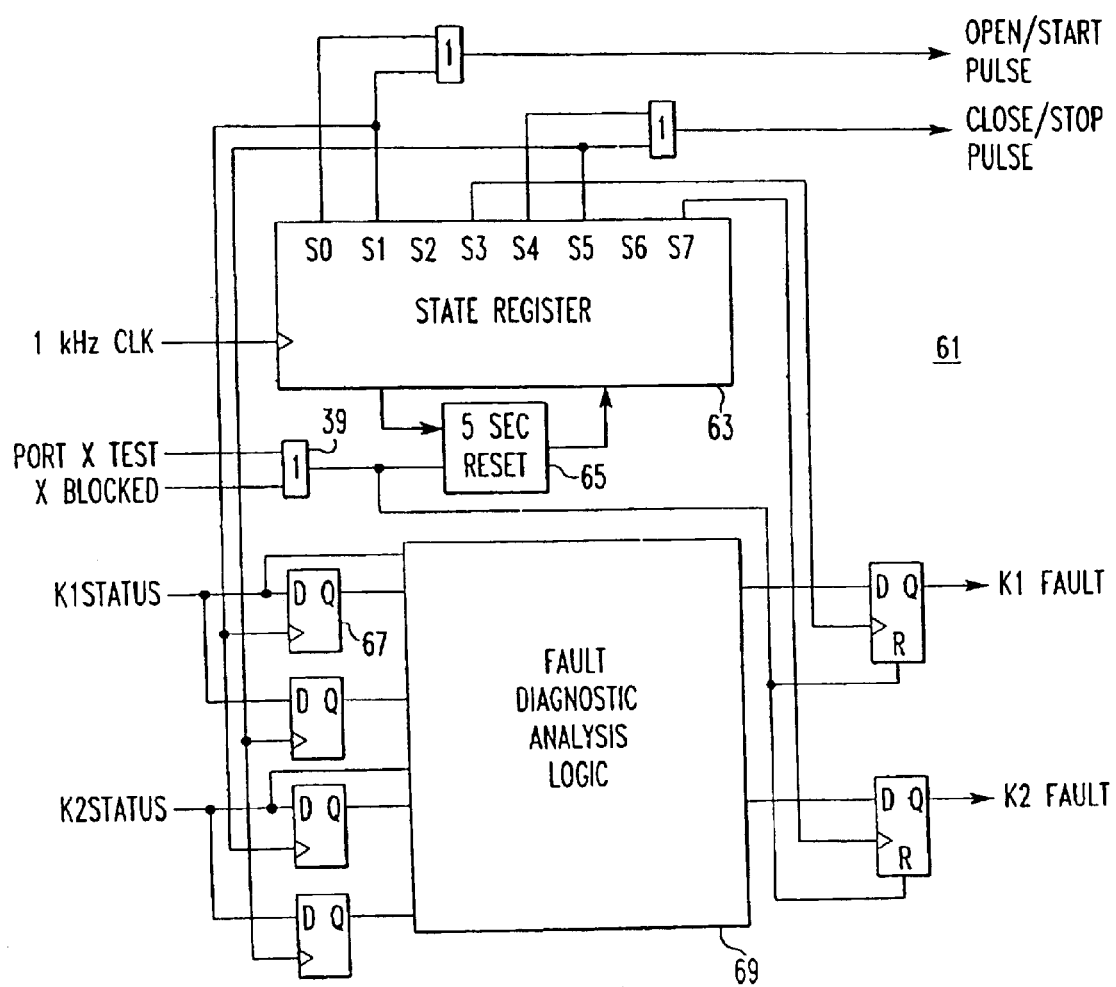
FIG. 7 is a block diagram of the pulse tester which forms part of the diagnostics.

FIG. 7 shows the pulse test logic 61 in more detail. An eight stage, state register 63 controls the operation and serves as a pulse generator. The state progresses from one value to the next at the 1 kHz clock frequency with the exception that at states 3 and 7 a five second timer 65 delays the entry into the subsequent state. This timer is held in the reset state by the Port X Test signal or by the X Blocked signal so that the continuous pulse tests will be suspended while a port test is in progress or if priority logic, such as the actuation of the local control switch, would prevent actuation through the Port X inputs. An Open/start command pulse is generated during states S0 and S1. The state of the current in both relays is latched by a latch 67 during S1. S2 is an idle state that allows the logic to return to normal. The result of the logic analysis logic is latched at the entry to state S3. A similar sequence is followed for the Close/stop pulse with the state numbers being offset by four from those for the Open/start input test. The logic conditions that hold the five-second timer 65 in reset shall also clear the latches that hold the result of the logic analysis. The pulse test is repeated continuously, approximately every 10 seconds.

Figure 8:
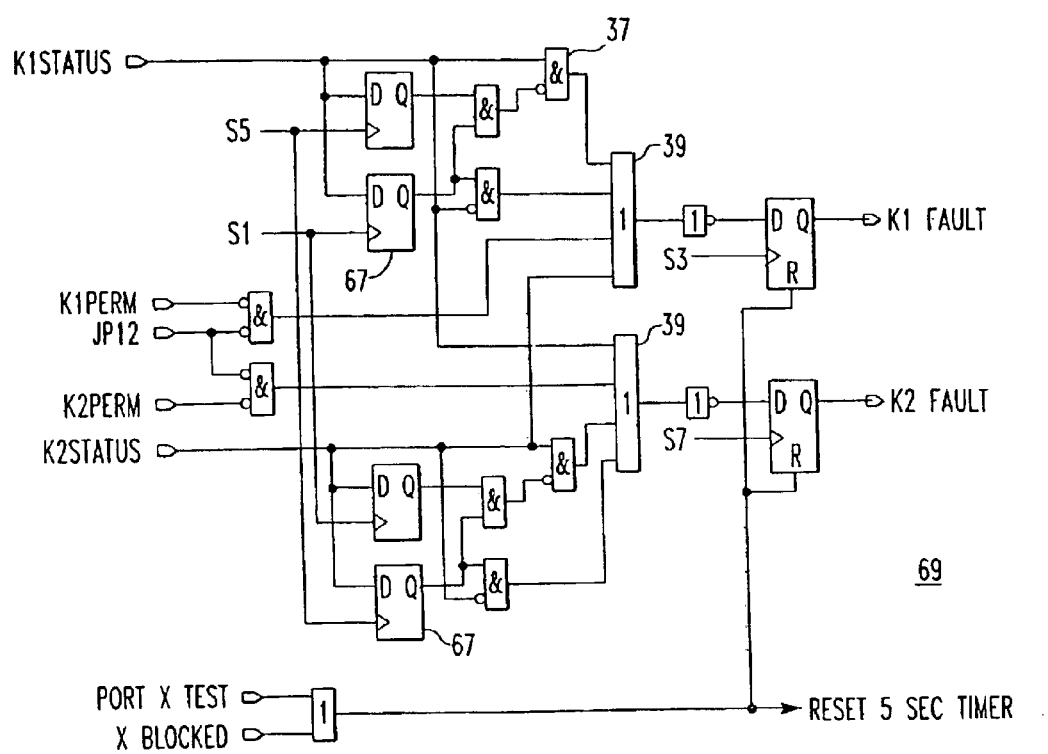
FIG. 8 is a block diagram of the pulse test analysis logic.

The test analysis logic 69 used to analyze the result of the diagnostic test is shown in FIG. 8. For each of the relays 27 and 29, the acceptable conditions are input to an OR gate. These conditions are 1) the relay is energized (however, one of the input pulses, either open or close, should have been able to de-energize it), 2) the relay was energized by the pulse input, 3) the opposite relay is energized (since this would block the output because both relays cannot be on at the same time), or 4) the component logic 45 has removed the command due to completion of travel. In the latter case, the pulses have not propagated through the priority logic 41 and the component logic 45 because the blocking logic 48 has determined that the relay should not be energized. This condition is implemented by the absence of the JP12 jumper and the absence of the K1PERM or the K2PERM signal (that permit the associated relay to be energized) from the component logic 45 illustrated in FIG. 4A.

If none of the above four conditions are TRUE, then the diagnostic fault latch is set for that relay. While the coverage of this diagnostic is not perfect, other diagnostics and signaling for the component complete the coverage. For instance, if the relay output is stuck in the energize state, thus blocking this diagnostic, the relay function monitoring described below will detect it. If a failed input of the CIM 3 falsely indicates the component position, thus blocking the diagnostic on completion of travel, then the actuation discrepancy alarm in the actuating system will draw attention to the fact.

Because the pulses change the states of the intermediate logic, it is necessary to latch the serial bus feedback signals during the S0, S1, S2, S4, S5 and S6 states.

Figure 9:
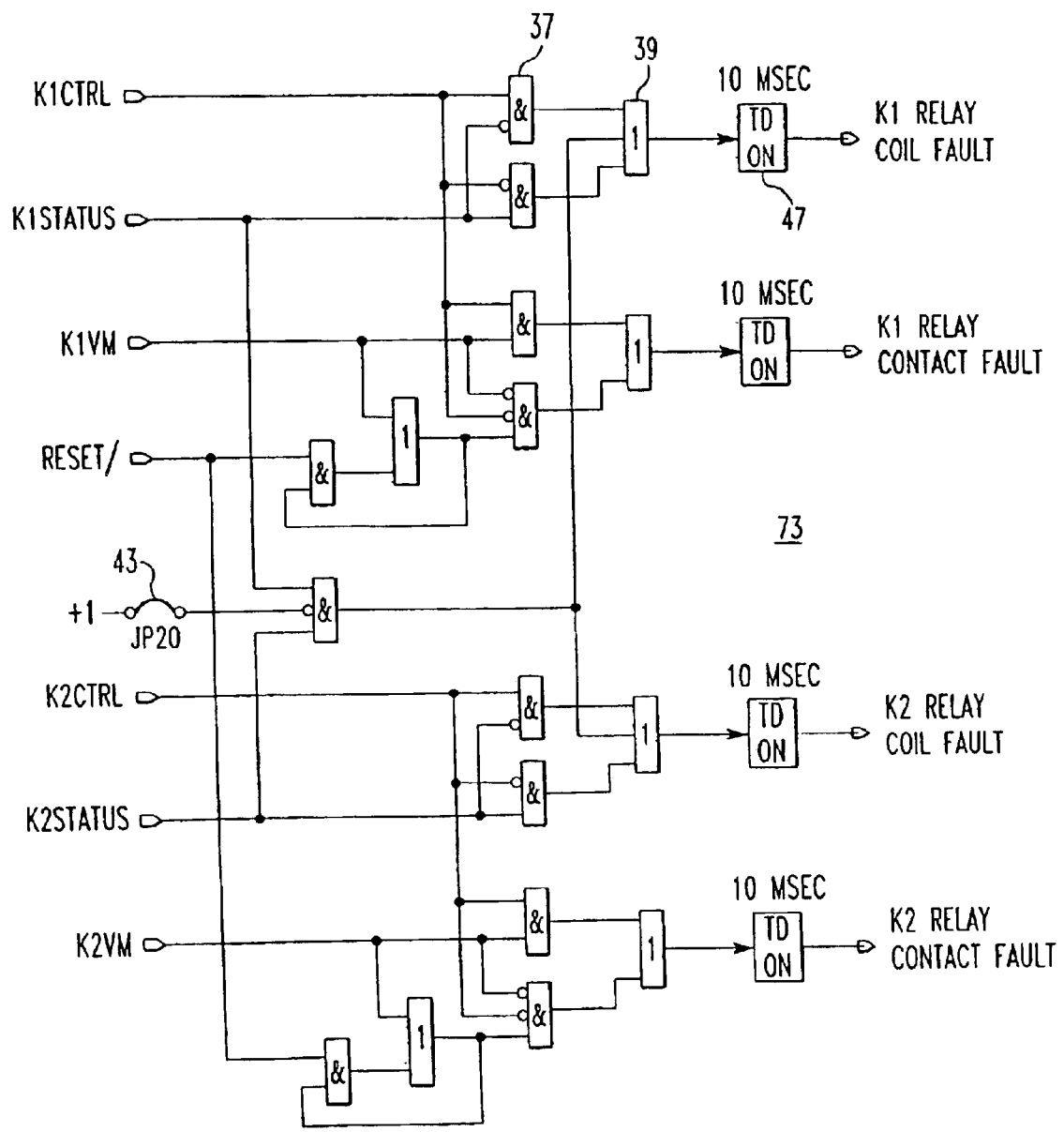
FIG. 9 is a block diagram of the relay function monitoring logic.

The third diagnostic performed by the CIM 3 is relay function monitoring. Feedback signals provided to the logic FPGA 25 from the relay coil current monitors 53 (see FIG. 5) and from the voltage monitors 71 across the A side of the first contact set 27c, 29c of the relays 27, 29 allows a static diagnostic of the relay interface to be performed. The relay function monitoring logic 73 shown in FIG. 9 is performed to monitor the two relay outputs.

Two monitoring functions are performed. First, the coil current monitor should match the logic state of the relay demand. Possible faults that could cause this to not be the case include the following:

Relay driver transistor failed (open or short)
Loss of relay coil supply voltage
Relay missing (unplugged)
Relay coil open circuit
Coil current detector failed
FPGA I/O pad failed In many cases, these failures will only be revealed on an attempt to actuate the output. Also, a check is made to verify that only one of the relays is energized at any time (if JP20 is not inserted). The tests are valid regardless of whether the relay is used in an output circuit or not. A 10-millisecond time delay prevents spurious indications during relay switching transients.

The second monitor is on the voltage indicated by the signals K1VM or K2VM across the A (normally open) side of the first contact set 27c or 29c. This is the principal contact used for module outputs. Voltage should be present if the contact is open (relay not energized) and the load circuit is energized. However, in some applications there will not be a voltage on the contacts of both relays. Perhaps this is due to only one relay being used, or due to the normally closed contact (B side) being used. For this reason, a logic latch is applied to the signal that detects loss of voltage. This part of the monitoring is armed by voltage being present at some time after the CIM is reset. Possible faults that would cause the indication of "contact" fault include:

Loss of control power from the actuated equipment
Failure of the relay contact (open or shorted)
FPGA I/O pad failed
Failure of the voltage monitor circuit on the Field Module Again, a 10 millisecond time delay is placed on the alarm to prevent false indications during switching transients.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A non-software based component interface module between first and second software based systems generating first and second sets of component command signals, respectively, and a controlled component that generates component feedback signals, the component interface module comprising:

a plurality of input ports through which the first and second sets of component command signals are input;

a non-software based processor arbitrating the first and second sets of component command signals and integrating therewith the component feedback signals to generate a component control signal; and an output device outputting the component control signal to the controlled component.

2. The component interface module of claim 1, wherein the processor includes priority logic arbitrating between the first and second sets of component command signals to select a priority component command signal, and component logic integrating selected component feedback signals with the priority component command signal selected by the priority logic.

3. The component interface module of claim 2, wherein the priority logic arbitrates between the first and second sets of component command signals to select the priority component command signal by one of a) system priority selecting as the priority component command signal a component command signal from one of the first and second sets of component command signals over the other, and b) function priority selecting as the priority component command signal a component command signal from either the first or second set of component command signals commanding a first function of the controlled component over another component command signal commanding a second related function of the controlled component.

4. The component interface module of claim 2, wherein each set of component command signals includes pairs of opposed component command signals and the component logic includes hold logic maintaining a component control signal generated by one of the opposed component command signals until the other of the opposed component command signals is selected as the priority component command signal.

5. The component interface module of claim 2, wherein the processor includes means for programming the selected component feedback signals for integration with the priority component command signal selected by the priority logic.

6. The component interface module of claim 5, wherein the means for programming the selected component feedback signal comprises jumpers.

7. The component interface module of claim 2, wherein the component logic includes blocking logic blocking generation of the component control signal in response to certain component feedback signals.

8. The component interface module of claim 7, wherein the certain component feedback signals include a component actuation completed signal and the blocking logic blocking the component control signal is responsive to the component actuation completed signal to block generation of the component control signal.

9. The component interface module of claim 2, wherein the processor includes diagnostic logic performing diagnostics on the component interface module.

10. The component interface module of claim 9, wherein the diagnostic logic includes a port interface tester testing at least one of the input ports.

11. The component interface module of claim 10, wherein the port interface tester comprises an input port latch latching as latched inputs the component command signals input by the at least one input port to the processor at the time the port interface test is initiated by the port interface tester, and means responsive to changes in component command signals received at the at least one input port from an associated one of the first and second software based system to generate an inport test pass signal.

12. The component interface module of claim 9, wherein the diagnostic logic comprises a pulse tester sending test pulses through the priority logic and component logic, and test analysis logic determining test results from propagation of the test pulses.

13. The component interface module of claim 12, wherein the pulse tester sends test pulses through the priority and component logic continuously.

14. The component interface module of claim 12, wherein the test analysis logic generates a test failure signal when no test pulses appear at the output device.

15. The component interface module of claim 12, wherein the component logic includes blocking logic blocking generation of the component control signal in response to certain component feedback signals, and the test analysis logic generates a test failure signal only when no test pulses appear at the output device and the blocking logic is not blocking generation of the component control signal.

16. The component interface module of claim 15, wherein the first and second sets of component command signals each include a pair of opposed component command signals and the output device comprises two output devices each responsive to a corresponding one of the opposed component command signals, the pulse tester alternately sending pulses through the priority logic and the component logic on the opposed component command signals, the test analysis logic generating a pulse test failure signal when either of the output devices does not see the pulse applied to the corresponding one of the opposed component command signals and the control signal has not been blocked by the blocking logic.

17. The component interface module of claim 16, wherein the component logic includes hold logic that maintains a control signal generated by one of the opposed component command signals until the other opposed component command signals is applied, and the test analysis logic generates a pulse test fail signal if the output device associated with the control signal that is maintained does not see the pulses on the opposed component control signal.

18. The component interface module of claim 9, wherein the output device comprises a relay and the diagnostic logic includes relay function monitoring logic.

19. The component interface module of claim 18, wherein the relay has a coil and relay contacts, and the relay function monitoring logic detects failure of the relay coil.

20. The component interface module of claim 19, wherein the relay monitoring logic includes a coil status sensor generating a coil status signal and the relay monitoring logic generates a coil failure indication when the component control signal and the coil status signal are either both at zero or both non-zero.

21. The component interface module of claim 20, wherein the relay monitoring logic includes a voltage sensor sensing voltage across the relay contacts and the relay monitoring logic generates a coil contact failure indication when the component control signal and the voltage across the relay contacts are both zero and when both are non-zero.

22. The component interface module of claim 1, wherein the component input signals are input to the processor and passed on to the first and second software based systems through the input ports.

23. The component interface module of claim 22, wherein the input ports are each connected to one of the first and second software based systems through one of a hard wire connection and a computer bus.

24. The component interface module of claim 1, wherein the first and second sets of component command signals are supplied to one of the input ports through one of a hard wire connection and a computer bus.

* * * * *